April 16, 1929.  B. MARTIN  1,709,404
BLOW TORCH
Filed Dec. 7, 1927  2 Sheets-Sheet 2
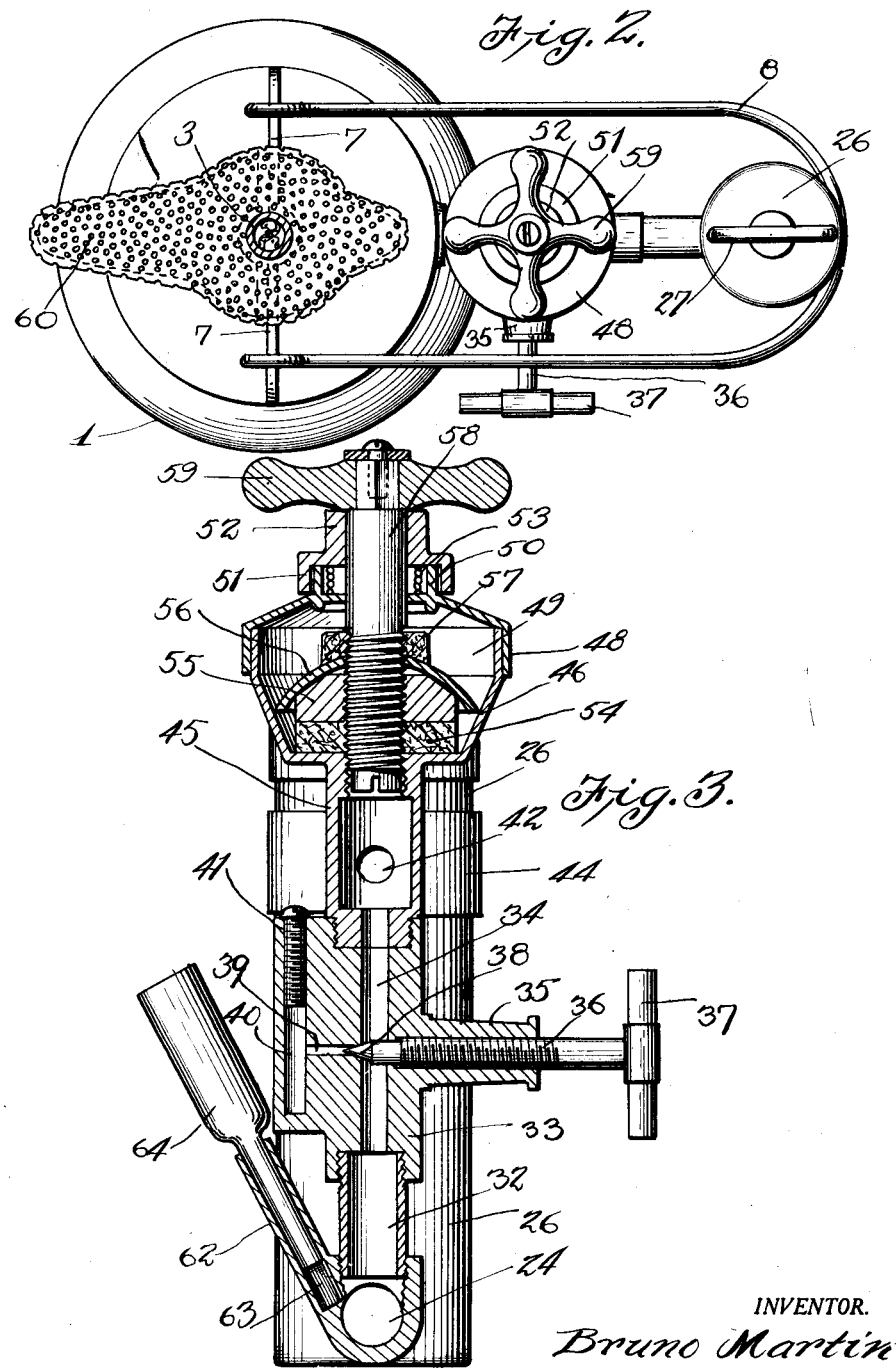
INVENTOR.
Bruno Martin
BY
E. K. Bond
ATTORNEY.

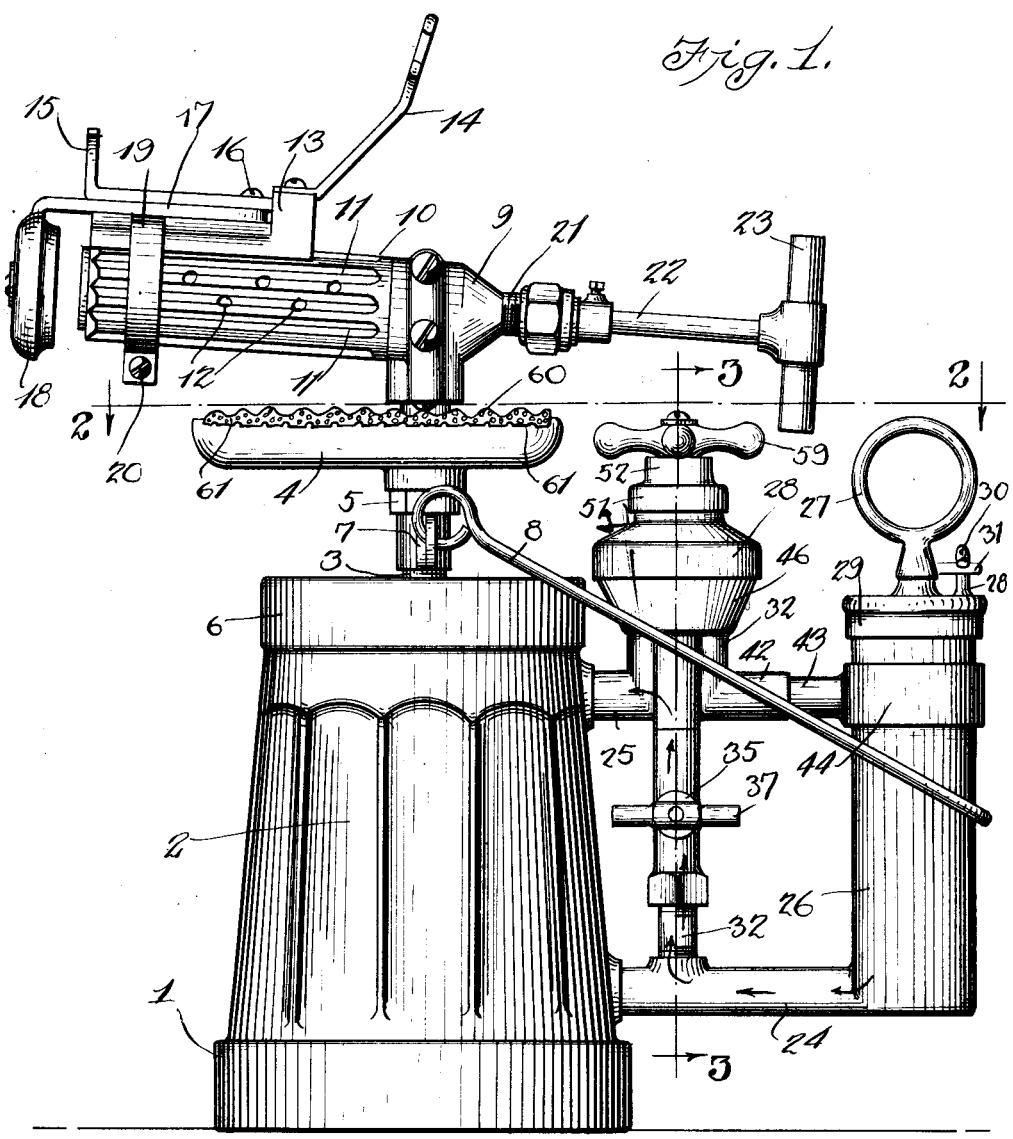

Patented Apr. 16, 1929.

1,709,404

UNITED STATES PATENT OFFICE.

BRUNO MARTIN, OF SAGINAW, MICHIGAN.

BLOWTORCH.

Application filed December 7, 1927. Serial No. 238,286.

This invention relates to certain new and useful improvements in blow torches, and has for an object, among others, to provide an improved blow torch of the general character now employed but shall conform to the provision of a law soon to be enacted, condemning any gasoline torch tank provided with a pump on top and a filling station at the bottom. This style of torch has been condemned as dangerous to life and property and it is my aim to provide a blow torch which will meet the requirements in this respect, as well as having various other novel characteristics which will commend the torch to all users of this class of devices.

It has for a further object to provide a tank of enlarged diameter at the bottom and tapering toward the top so as to increase the pressure.

I provide both the pump and the filling station on the side of the tank, and I also provide means whereby the pumping in of the air will not stir the settlement of the oil and thus the flame is not prevented from burning. I accomplish this by so arranging the pump and its connections as to pump air in on top of the tank.

I provide a pivoted handle whereby the torch may be more conveniently carried about from place to place.

The present invention has for a further object to protect the burner against being smoked up with grease and soot. In the present instance, I accomplish this by means of a perforated and preferably corrugated plate disposed on top of the drip-cup.

Other objects and advantages of the invention will hereinafter appear and the novel features thereof will be particularly pointed out in the appended claims.

The invention in its preferred form is clearly illustrated in the accompanying drawings, which, with the numerals of reference marked thereon, form a part of this specification, and in which:—

Figure 1 is a side elevation of a blow torch constructed in accordance with my present invention.

Figure 2 is a top plan view of the same with the burner tube and other parts removed, the removed parts being those above the section line 2—2 of Fig. 1.

Figure 3 is an enlarged vertical section taken on the line 3—3 of Fig. 1, looking in the direction of the arrows.

Like numerals of reference indicate like parts throughout the several views.

Referring to the drawings, 1 designates a tank of tapering form being materially larger at the bottom than at the top in order to increase the pressure within the upper portion of the tank, and this tank is, in the present instance, shown as vertically corrugated as at 2 in Fig. 1.

Mounted centrally within the top of the tank is a pipe 3 upon which is mounted the drip cup 4 which may be of any well known or approved form of construction, except as hereinafter may be specified. This drip-cup may be placed at any desired height as occasion may require by means of the nut 5 screwed upon the threaded portion 6 of the pipe 3 as will be readily understood from reference to Fig. 1.

Upon the pipe 3, is a handle or bail-supporting member 7, which bodily embraces the said pipe, and in opening the ends of which is loosely mounted so as to swing into any desired position, the bail or handle 8, by which the torch may be readily carried and by reason of this loose movement, the bail may be brought into any desired position relatively to the tank. In Figs. 1 and 2 this handle or bail is shown as of such length and other dimensions as to swing down over the top soon to be described, and as clearly shown in Figs. 1 and 2.

Upon the top of the tube 3, is mounted the burner tube support 9 in which is detachably mounted the burner tube or barrel 10, which is provided with longitudinal corrugations 11 and between these corrugations are apertures 12 as seen clearly in Fig. 1.

Upon the burner tube or barrel 10 is mounted the member 13, one end of which is secured to the member 14 while a fork member 15 is disposed in the other end of the barrel, mounted upon a screw 16 engaged in the barrel and between which member and the barrel is disposed an arm 17 as seen in Fig. 1 which has pivotal movement upon said screw and at its outer end carries a cup-shaped member 18 which serves as a safety-combustion guard and as a preventor against the ignition of nearby articles, and hence constitutes a fire-protector as well as a protector against wind when the burner is in use.

A band 19 encircling the burner tube and the horizontal member of the member 13 serves to firmly clamp the member 13 in position upon the barrel, the ends being tightened by means of a screw 20 as seen in Fig. 1. The members 14 and 15 serve as a support for the iron while being heated.

The member 9 has an extension 21 in which is rotatably mounted the valve stem 22 having suitable handle 23 as shown in Fig. 1, and which is designed to serve the usual function of a regulating valve, common to such devices.

24 is a pipe secured in the tank 1 near the lower end thereof, while 25 is the pipe secured in the same side of the tank near the top, as shown best in Fig. 1.

Mounted upon the tube 24 is a pump barrel 26 in which is designed to be reciprocated a piston, of any well-known type, having a handle 27 by which it may be reciprocated, being understood that suitable packing is employed where necessary.

28 is an arm projecting from the removable cap 29 of this barrel and having its upper end hooked, as seen at 30, beneath which is adapted to engage the free arm of a lateral arm 31 carried by the stem of the piston of the pump. By this means the piston is locked against reciprocable movement, but a slight rotation of the same will disengage the arms 31 from the hook portion from the member 28, as will be readily understood upon reference to Fig. 1.

Rising from the lateral member 24 is the tubular member 32, the latter being screw-threaded at both ends, and the upper end is secured to a member 33 provided with a longitudinal passage 34 and a lateral member 35 in which is adjustably mounted the threaded member 36 having at its outer end a suitable handle 37 by which it may be manipulated, and at its inner end carrying a tapered valve 38 controlling the passage 34 as will be readily understood by reference to Fig. 3. This valve also controls the passage 39 in the member 33 which latter communicates with a vertical passage 40 in the member 33, which passage 40 is provided with a longitudinally adjustable screw closure 41, as seen clearly in Fig. 3.

The member 33 has extending therefrom near its upper end, the lateral member 42, in which is secured a shank 43 of an annular band 44 embracing the upper end of the pump barrel 26 as seen best in Fig. 1.

The pipe 25 hereinbefore referred to extends inwardly from the member 32 and the upper end of this member receiving the depending threaded portion 45 of the top 46 serves as the filling cup, which latter is provided with a cap 47 having a depending flange 48 embracing the flange 49 of the cup, seen clearly in Fig. 3. This cap 47 is provided with the cup-shaped member 50 at its upper end as seen clearly in Fig. 3, which is embraced by the depending flange 51 of the member 52 and within the cup-shaped member 50 is the spring 53, see Fig. 3.

Within the cup and resting upon the bottom thereof is a packing member 54, see Fig. 3, upon which bears the notch or the like 55 which is overhung by an inverted dish-shaped member 56, 57 being a packing upon the same and surrounding the stem 58 having suitable handle 59 and the inner end of which is threaded into the bottom of the cup, all as clearly shown in Fig. 3.

Mounted upon the drip-cup 4 is a perforated transversely corrugated plate 60, see Figs. 1 and 2, which may be retained in place in any suitable manner, as by having its edges bent downwardly as at 61 and slightly embracing the edges of the drip-cup. This serves to protect the burner against being smoked up with grease and soot and hence I designate it an "oil grease consuming plate".

62 is an inclined receptacle disposed at the lower portion of the member 32, in the present instance being shown as closed at its lower end and which forms a receptacle for a brush 63 having suitable handle 64. This serves to retain the brush when not otherwise used.

Attention is called to the fact that by the arrangement above described, I uilize the same inlet for both the gasoline and the air into the tank. This makes a most efficient arrangement and produces better results.

Modifications in detail may be resorted to without departing from the spirit of the invention or sacrificing any of its advantages.

What I clam as new is :—

1. In a blow torch, a tank, a filling means at the side thereof and an air pump conjointly supported there being a conjoint inlet for gasoline and air into the tank.

2. In a blow torch, a tank, a filling means at the side thereof and an air pump conjointly supported there being a conjoint inlet for gasoline and air into the tank, said filling means and air pump being in substantially horizontal alignment with each other.

3. In a blow torch, a tank, filling means therefor mounted to one side of the tank, an air pump also mounted to one side of the tank, and means whereby the filling means and air pump are conjointly mounted with the inlet for both the gasoline and air into the tank through a common passage.

4. In a blow torch, a tank, filling means therefor mounted to one side of the tank, an air pump also mounted to one side of the tank, means whereby the filling means and air pump are conjointly mounted with the inlet for both the gasoline and air into the tank through a common passage, and provided with an inlet to the tank near the top thereof.

5. In a blow torch, a tank, filling means therefor mounted to one side of the tank, an air pump also mounted to one side of the tank, means whereby the filling means and air pump are conjointly mounted, and provided with an inlet to the tank near the top thereof, said inlet being common to both filling means and discharge from the air pump.

6. A blow torch having a tank and cooperative correlative filling means and air supplying means, both communicating with the upper end of the tank through a passage common to both gasoline and air.

7. In a blow torch, a pump barrel with a lateral hollow member, a tubular member rising from said lateral member, a member mounted on the tubular member and having a longitudinal passage, and a lateral passage leading from said longitudinal passage, the lateral passage having a vertical passage leading therefrom, and a valve controlling the longitudinal and lateral passages.

8. A structure in accordance with claim 7 in which there is an adjustable member in said last named vertical passage.

In testimony whereof I affix my signature.

BRUNO MARTIN.